Figure 1:
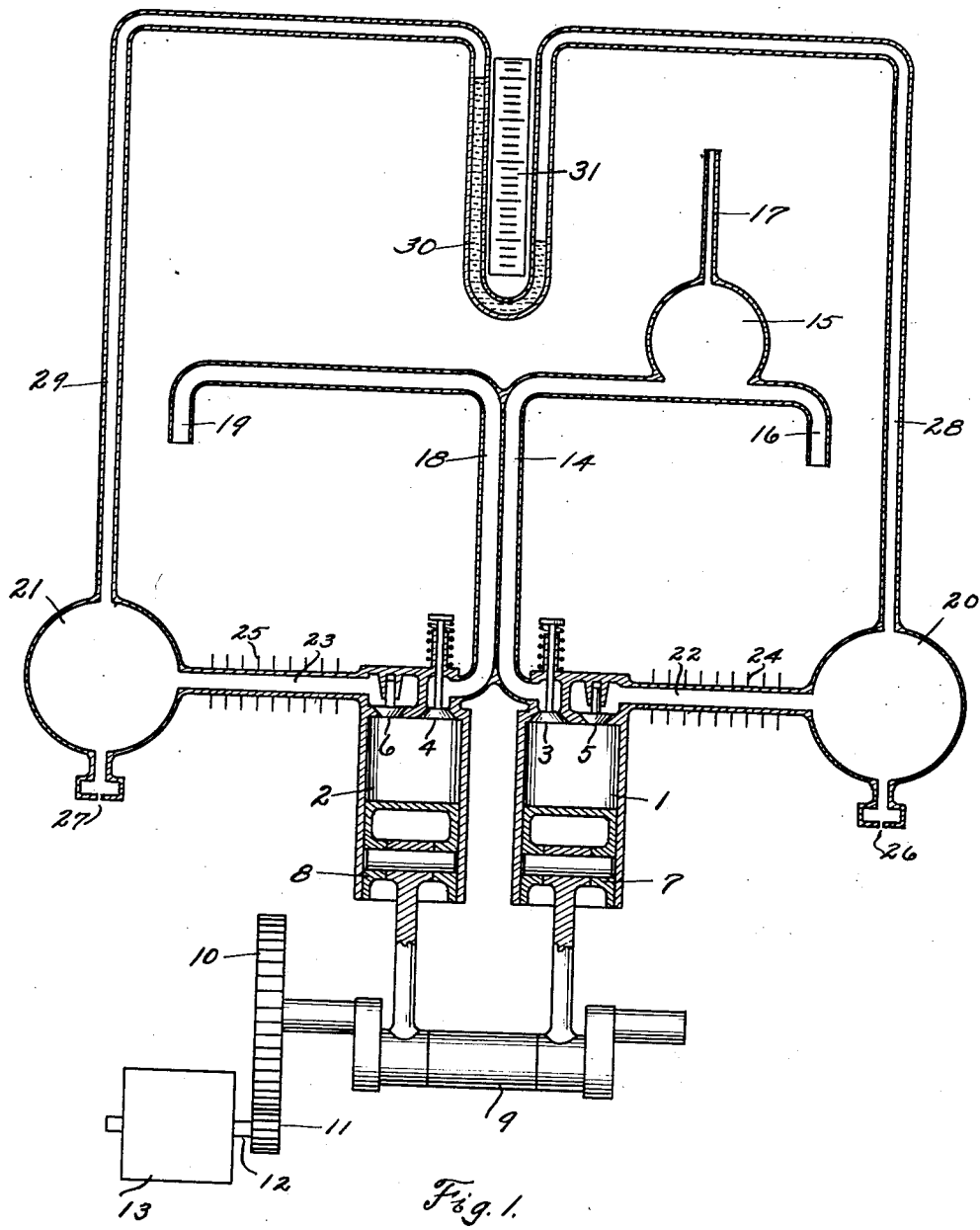

UNITED STATES PATENT OFFICE.

PERRY OKEY, OF COLUMBUS, OHIO.

FLUID-DENSITY METER.

1,354,681.     Specification of Letters Patent.     Patented Oct. 5, 1920.

Application filed February 6, 1919. Serial No. 275,385.

*To all whom it may concern:*

Be it known that I, PERRY OKEY, a citizen of the United States, residing at Columbus, in the county of Franklin and State of Ohio, have invented certain new and useful Improvements in Fluid-Density Meters, of which the following is a specification.

This invention relates to fluid density meters and is primarily designed to register continuously and automatically the relative specific gravity or density of one fluid as compared with the density or specific gravity of another fluid which latter is used as a standard or reference.

In carrying out my invention, I have based the same primarily upon two well known laws, the one being that equal volumes of any gas, under the same conditions of temperature and pressure, contain the same number of molecules. The second law relates to the velocity of efflux of a gas through an orifice, the velocity varying, when under the influence of pressure, upon the molecular weight of the gas being discharged, the velocity varying inversely as a square root of its density or molecular weight. From this law, it will be apparent that the velocity of discharge of a heavy gas through an orifice will be slower than that of a lighter gas through the same size of orifice and that therefore, in order to discharge the same volume of the heavier gas, a greater pressure will be required for the heavier gas than will be necessary for the lesser. In other words then a greater pressure will be required to discharge the same quantity of molecules of the heavier gas than will be necessary for the lighter gas. The relative density or specific gravity of the two gases may then be determined very readily where the discharge or efflux is continuous and where the volumetric supply is also constant and continuous.

My invention, therefore, resides essentially in determining the difference in pressures required to maintain a constant volumetric flow of one fluid through an orifice as compared with the flow of the standard fluid through the same size of orifice.

In the following detailed description of my invention, I intend that the term "pressure" shall be interpreted as being above or below atmospheric pressures or, in other words, to include "suction" or "partial vacuum" as pressure. Also, the term or expression "continuously," where it relates to the flow of fluid is not intended to be interpreted as meaning forever, day in and day out, but only to such extent that a state of equilibrium will have been reached in the instrument as a whole as far as pressures are concerned whether this be of the compression or suction type, to cause a constant volumetric flow of the separate fluids under proper working conditions. Where a continuously registering matter is desired for any given time, this state of equilibrium must be maintained for that time but where only one reading is desired, the operation of the instrument need only be continuous until this proper state of equilibrium has been reached.

Figure 2:
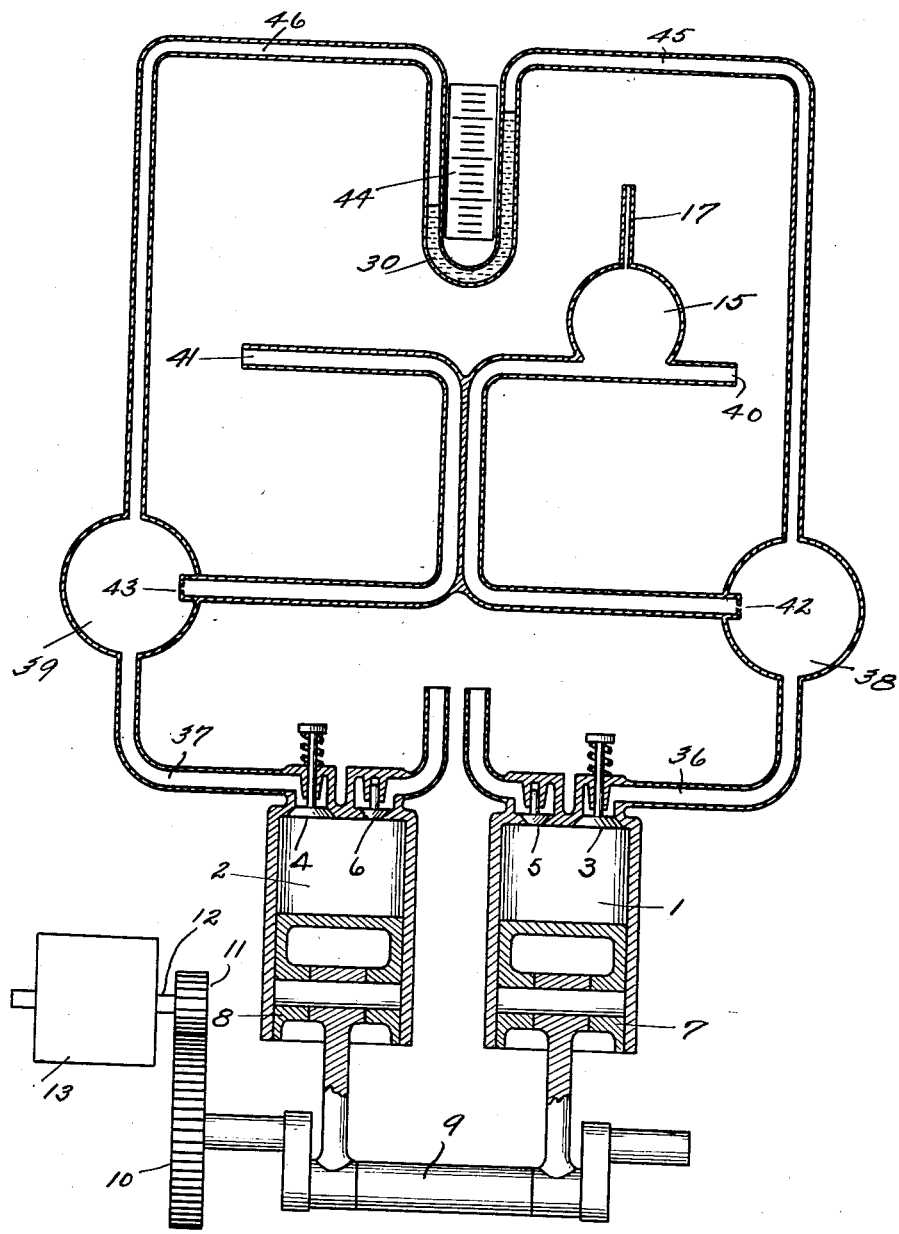

The preferred embodiment of my invention is shown in the accompanying sheets of drawings wherein similar characters of reference designate corresponding parts and wherein, Figure 1 diagrammatically illustrates one embodiment of my invention wherein the compression pressure principle is utilized, and Fig. 2 is a similar diagrammatic view illustrating my improved density meter wherein the suction or partial vacuum pressure principle is utilized.

In both Figs. 1 and 2, there are illustrated pumps 1 and 2, each being provided with intake valves 3 and 4 and discharge valves 5 and 6 respectively. Fig. 1 illustrates these pumps as being of the compression type while Fig. 2 illustrates them as being of the suction type. Both are provided with pistons 7 and 8 respectively driven synchronously by means of the crank structures 9 which carry gears 10 at one end meshing with pinions 11 carried upon the armature shafts 12 of motors 13. Both pumps are illustrated as being of the same diameter and their pistons as traveling the same stroke so that their volumetric capacities are identical. Also, it is intended that the motor shall run continuously during the time the relative densities are being registered so that the supply of fluids to the separate parts will be continuous and at a constant rate.

The present embodiments of my invention are illustrated for use particularly in connection with gases and as such, Fig. 1 is shown as drawing its gas through the conduit 14 from the container 15 in which there is constantly maintained a supply of the gas whose specific gravity it is desired to obtain, this supply being obtained from a source 16 whose pressure is maintained equal to that of the atmosphere, the fluid with which its density is being compared, by means of the vent 17 which latter is always open to the atmosphere so that atmospheric pressure will exist in this container 15. The compressor 2 is connected by means of its intake valve with the conduit 18 which is connected to a suitable source of supply of the second fluid which is the standard by which the first is being compared but in this case, as stated, it is assumed as being atmospheric air which is taken into the system at 19. In order that the separate fluids or gases may be taken into their compressors under like conditions of temperature as well as pressure, I have so located the conduits 14 and 18 that a heat interchange will be effected prior to the admission of these fluids to their pumps so that they enter their pumps at like temperatures.

Fig. 1 also illustrates the compressor pumps as being connected through their respective exhaust or discharge valves 5 and 6 to their receivers 20 and 21 by means of the pipes 22 and 23 respectively. These latter pipes are shown as being provided with radiating flanges 24 and 25 which serve to dissipate whatever heat may be in the fluids or gases to bring their temperatures down to that of the surrounding atmosphere. These receivers are also each provided with discharge orifices 26 and 27 through which the fluids or gases within the containers are discharged. These containers are further connected by means of pipes 28 and 29 to a differential pressure gage capable of registering any difference in pressures existing in the fluids in the two receivers. This differential pressure gage is shown at 30 and comprises a U tube partly filled with mercury or any other suitable liquid to the legs of which the pipes 28 and 29 are connected. A scale 31 is also associated with this U tube by means of which any difference in level of a liquid in the two tubes may be readily measured or ascertained.

The operation of the structure as shown in Fig. 1 is as follows. The motor 13 is assumed to be running at a constant rate and therefore compressor pumps 1 and 2 will draw in fluids or gases from their separate sources, in the present instance, it being assumed that compressor pump 2 will draw in atmospheric air at 19 and compressor pump 1 a gas from the reservoir 15 which is heavier than air. The gases are each taken from their respective sources at the same pressure due to the vent 17 of the reservoir 15 being open to the atmosphere. These incoming gases are also caused to acquire the same temperature by the provision of the heat interchanger in the form of the structure of conduits 14 and 18. The volumes of the compressors 1 and 2 being constant, and in this instance being equal, and the temperature and pressure of the gases inducted into the compressors being constant and in this case, also equal, it follows from the first mentioned law that the same number of gaseous molecules will be taken into each of the compressor pumps at each suction stroke and that these equal volumes of gas, and consequently, equal number of gaseous molecules, will be compressed and delivered to the containers 20 and 21 by the next stroke of the pistons. Because of the second law mentioned, namely, that the velocity of efflux of the gas through an orifice when under the influence of pressure is dependent upon the molecular weight of the gas being discharged, this velocity varying inversely as the square root of its density or molecular weight, it follows that the velocity of discharge of the heavier gas through the orifice 26 will be slower than that of the air discharged through the orifice 27. This slower initial discharge velocity of the heavier gas will cause a higher pressure to accumulate in the container 20 than the pressure existing in the container 21. This pressure will continue to increase until the number of molecules discharged through the orifice 26 under the influence of its higher pressure will equal the number of lighter molecules discharged through the orifice 27 in any given unit of time. This pressure will be built up by the constant rate of supply of the separate gases to their respective containers and because of the orifices, a pressure will ultimately be reached in each of these containers which discharge the same number of molecules in each unit of time as is being supplied in that same unit of time. When this point is reached, a state of equilibrium has been attained in the sense defined in the forepart of this specification and from then on, under the continued operation of the compressor pumps, the relative densities of the two gases may be measured by simply measuring the difference in pressures existing in the receivers 20 and 21. For convenience, this reading may be taken from the indicating differential pressure gage 30 by measuring the difference of liquid levels in the two legs of the U tube.

Another alternative arrangement is such as shown in Fig. 2 of the drawings wherein the gases are drawn through orifices instead of being forced through. In this case, the pumps are of the suction type and are each provided with intake valves 3 and 4 and discharge valves 5 and 6. The intake valves are connected by means of conduits 36 and 37 to containers 38 and 39. The two fluids are also in turn taken from their respective sources 40 and 41 under conditions similar to those described in connection with Fig. 1 so far as pressure and temperature is concerned. The suction of the pumps draws these gases through their respective orifices 42 and 43 and, because of the laws already described, a greater suction will exist in the container 38 which receives the heavier gas than that existing in the container 39. This difference in pressures may be registered by means of the differential pressure gage 44 of the same type as shown in connection with Fig. 1 and in this instance, connected by means of the pipes 45 and 46 to the containers 38 and 39.

From the foregoing description, taken in connection with the accompanying sheets of drawings, it will be apparent that I have provided a density meter of an extremely novel form and which may be made to fill the long felt want, namely, that of continuously giving an indication of the relative specific gravities or densities of any two fluids, and particularly, any two gases. If desired, this registration may be recorded but one very advantageous feature is attained by obtaining the relative densities at a glance through the gages shown at 31 and 44. Further, it will be understood that the exact proportions shown need not necessarily be used as those shown are merely illustrative. Such changes as pump sizes of different proportions, etc., may be resorted to but it will be necessary to take into account these or other variations in the final calculation all as must be apparent to those skilled in the art.

What I claim is:

1. A density meter comprising a pair of containers, a pair of pumps operatively associated with said containers, means for operating said pumps at constant rates to cause a constant volumetric flow of separate fluids through separate orifices of known relation and through said containers, means for maintaining a constant relation between the temperatures of said fluids passing through said orifices, and means for measuring the difference in pressures built up in said containers.

2. A density meter comprising a pair of containers, a pair of pumps operatively associated with said containers, means for operating said pumps at constant rates to cause a continuous flow of constant volumetric portion of separate fluids into said containers, said containers being provided with discharge orifices of known relation, means for maintaining a constant relation of temperature and pressure between said fluids prior to their entrance into said containers, and means for measuring the difference in pressures built up in said containers.

3. A density meter comprising a gage and registering structure capable of measuring a difference of pressure between two fluids, means for continuously supplying said two fluids to said structure at constant volumetric rates, and means for maintaining a constant relation of temperature and pressure between said fluids prior to their supply to said structure.

4. A density meter comprising a pair of compression pumps having intake and discharge valves, a pair of containers connected with said discharge valves, said containers having discharge orifices of known sizes, means leading into the intake valves of said compressors for conveying two separate fluids, said means being arranged so that the heat of one fluid will be transferred to the other until both are at the same temperature, and means for registering the difference in pressures built up within said containers.

In testimony whereof I affix my signature.

PERRY OKEY.